J. C. HUNT.
Apparatus for Steaming Grain.

No. 167,837. Patented Sept. 21, 1875.

Witnesses:
Heinrich F. Bruns
L. A. Bunting

Inventor:
John C. Hunt

UNITED STATES PATENT OFFICE.

JOHN C. HUNT, OF CHICAGO, ILLINOIS, ASSIGNOR TO CHICAGO WHEAT-STEAMING MACHINE MANUFACTURING COMPANY, OF SAME PLACE.

IMPROVEMENT IN APPARATUS FOR STEAMING GRAIN.

Specification forming part of Letters Patent No. 167,837, dated September 21, 1875; application filed January 9, 1875.

*To all whom it may concern:*

Be it known that I, JOHN C. HUNT, formerly of Sioux City, county of Woodbury, State of Iowa, now of Chicago, county of Cook, State of Illinois, have invented certain Improvements in Apparatus for Steaming Grain, of which the following is a specification:

This invention relates to the combination, with the grinding mechanism of a flour-mill, of an apparatus for steaming and heating the grain, or steaming or heating it, immediately before delivering it to the said grinding mechanism.

The importance of attaching to a grinding-mill a steaming or heating drum, whereby the grain can be steamed by carrying steam in direct contact with it as it is fed to the grinding-stones, or, if the grain is moist, it can be heated without admitting the steam directly in contact with it, is becoming well understood.

The invention consists of the combination of parts, hereinafter more fully described, whereby the grain is thoroughly separated, so that each kernel comes in contact with the steam, when steam is admitted, and more thoroughly in contact with the heat from the heating-drum, so that the beneficial result is more uniformly accomplished.

Figure 1:
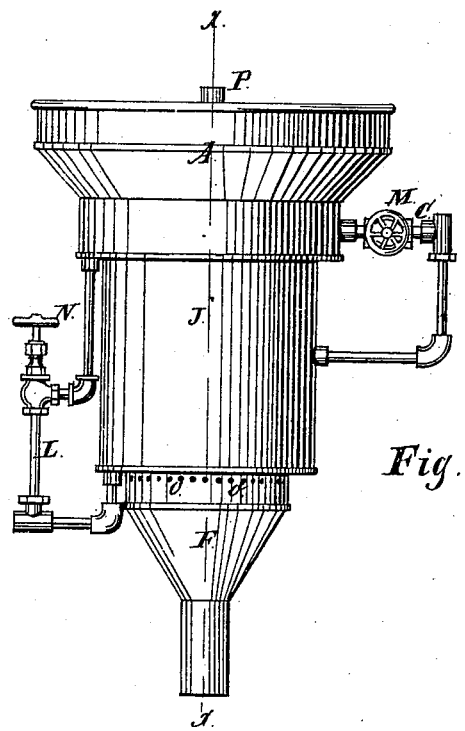
Figure 2:
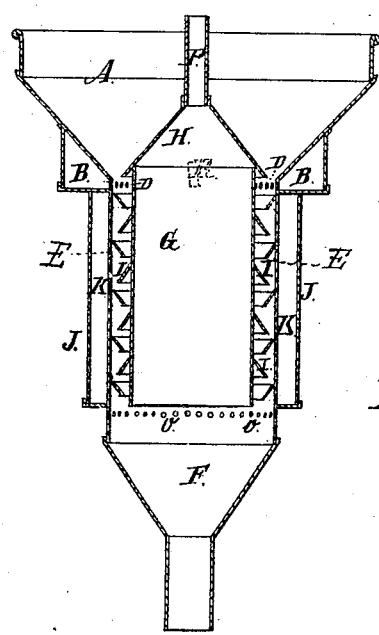

In the annexed drawing, Figure 1 represents a side elevation of my steaming and heating apparatus, and Fig. 2 a vertical central section taken at the line *x x*, Fig. 1.

A represents the hopper into which the grain is placed. B represents a steam-chamber surrounding the bottom of the hopper. The steam passes into this steam-chamber from the steam-pipe C, and passes through the perforations D directly in contact with the grain at the bottom of the hopper. E is a cylinder extending from the bottom of the hopper A down to the gathering funnel or hopper F, which gathers the grain and conducts it directly into the eye of the millstone. G is a cylinder placed centrally within the cylinder E. H is an inverted funnel covering the top of this central cylinder G, and extending down, leaving a narrow annular space between it and the bottom of the hopper, where the steam is admitted. The grain, in passing through this narrow space, is brought directly in contact with the steam passing through the perforations D. I are narrow annular strips or ledges attached alternately to the inner side of the cylinder E and the outer side of the cylinder G, and so arranged that the grain, in passing down the space between these cylinders, will strike upon these strips or ledges, and be forced to change its course, and so agitate it that each kernel is more thoroughly subjected to the action of the heat from the surrounding heating-drum. J is an exterior drum or jacket surrounding the cylinder E, and extending nearly its entire length. The space K between the cylinder E and the drum or jacket J forms a steam-chamber, into which the steam is admitted from the steam-pipe C. L is a drip-pipe connected with the steam-chamber B, and also with the steam-chamber K, and carries off the condensed steam from both chambers. By opening the valve M in the pipe C steam is admitted into the steam-chamber B, and passes directly in contact with the grain. Steam is also admitted to the chamber K, and the grain is subjected to the heat of the steam as it passes down over the inclined annular strips or ledges I. When it is desired to only heat the grain without steaming it the valve M is closed, and the steam only passes into the chamber K. The valve N in the drip-pipe L is also closed to prevent the steam from passing up said pipe into the chamber B. O are air-holes for the admission of a current of cold air after it comes from the heating process. The air passes in contact with the grain up through the central cylinder G, and out at the ventilating-pipe P, which extends up above the top of the hopper. I prefer to perforate this central cylinder G with small holes, so that the steam from the grain, while being heated, can pass through this cylinder and escape at the ventilating-pipe. The central cylinder G, with its conical cover, is held in position by strips or supports R attached to the hopper or surrounding cylinder E.

By this apparatus the grain may be either steamed, or heated, or both, and then the steam and moisture taken from its surface before it passes through the grinding-stone to be ground.

I claim—

1. The combination of the cylinders E and G, the annular ledges I, and the steam-chamber B, substantially as and for the purposes specified.

2. The combination of the cylinders E and G, the steam-chamber B, the annular ledges I, the heating-drum J, and air-holes O, as and for the purposes specified.

JOHN C. HUNT.

Witnesses:
　LEWIS L. COBURN,
　E. HEMPSTEAD.